United States Patent [19]
Manor et al.

[11] Patent Number: 6,097,158
[45] Date of Patent: Aug. 1, 2000

[54] LOW VOLTAGE ILLUMINATION SYSTEM

[75] Inventors: Dror Manor, Herzliya; Victor Zinkler, Jerusalem; Shafrir Romano, Rishon LeZion; Shaul Barak, Ramat Gan, all of Israel

[73] Assignee: Lightech Electronics Industries, Ltd., Rishon LeZion, Israel

[21] Appl. No.: 09/087,977

[22] Filed: Jun. 1, 1998

[51] Int. Cl.[7] .................................................. H05B 37/00
[52] U.S. Cl. ......................... 315/127; 315/200 R; 307/66
[58] Field of Search ........................ 315/200 A, DIG. 4, 315/307, 241 S, DIG. 7, 209 R, 291, 205, 200 R, 206, 207, 127, 224; 307/66, 65

[56] References Cited

U.S. PATENT DOCUMENTS

| | | | |
|---|---|---|---|
| 3,840,798 | 10/1974 | Burchall et al. | 321/2 |
| 4,302,805 | 11/1981 | Marez et al. | 363/91 |
| 5,010,314 | 4/1991 | Estrov | 336/198 |
| 5,029,299 | 7/1991 | Rodgers | 330/298 |
| 5,077,486 | 12/1991 | Marson et al. | 307/95 |
| 5,303,114 | 4/1994 | Ferry et al. | 361/101 |
| 5,523,653 | 6/1996 | Plank, Jr. | 315/119 |
| 5,773,937 | 6/1999 | Miyazaki et al. | 315/246 |
| 5,815,384 | 9/1998 | Hammond et al. | 363/26 |

FOREIGN PATENT DOCUMENTS

| | | |
|---|---|---|
| 3735989 | 5/1989 | Germany . |
| 4112676 | 12/1991 | Germany . |

OTHER PUBLICATIONS

Abstract of Japanese Patent 06.029.134.
Abstract of Japanese Patent 01.170.367.

*Primary Examiner*—Don Wong
*Assistant Examiner*—Tuyet T. Vo
*Attorney, Agent, or Firm*—Browdy and Neimark, PLLC

[57] ABSTRACT

A low voltage illumination system, comprising a pair of terminals for connecting to a source of low frequency a.c. voltage, a frequency converter coupled to the source of a.c. voltage for converting the low frequency a.c. voltage to high frequency a.c. voltage, and a step down transformer coupled to an output of the frequency converter for converting to high frequency, low voltage a.c. A synchronous rectifier is coupled to a secondary of the step down transformer for converting the high frequency low voltage a.c. to a low magnitude nominally d.c. voltage, and a pair of conductors is connected to the low magnitude nominally d.c. voltage for connecting low voltage lamps thereto. Optionally, the step down transformer is of planar design and an integral overload protection circuit is provided responsive to a drop in output impedance across the conductors commensurate with an overload for interrupting power thereto.

20 Claims, 6 Drawing Sheets

LOW VOLTAGE ILLUMINATION SYSTEM

FIELD OF THE INVENTION

This invention relates to power supplies for low voltage illumination.

BACKGROUND OF THE INVENTION

Owing to the prevalence of halogen lamps, low voltage illumination is becoming increasing popular and offers the advantage of small bright lamps together with increased safety in the event of contact with the supply terminals. In particular, the use of low voltage lends itself to track lighting and cable lighting systems, using halogen lamps or other low voltage lamps, which can be moved along a fixed track mounted on the ceiling so as to be directed to those places where illumination is most required.

Various proposals for low voltage illumination are known in the art. Most employ a transformer for transforming the high electrical supply voltage (typically 110 V or 220 V) to a low voltage in the order of 12 V. Since the size of the transformer is dependent on its power rating, such transformers are necessarily bulky. It is therefore known in the field of a.c. illumination to invert the incoming electrical supply voltage using a conventional rectifier and chopper circuit so as to obtain a pulsating a.c. voltage source having a high frequency in the order of 30 KHz. The use of high frequency permits the size of the transformer to be greatly reduced.

In one known arrangement a central transformer provides power at low voltage (typically 12 V) to a track, rail or cable system to which low voltage lamps can then be directly connected. However, it has been found that such a proposal, although attractive, is subject to the drawback that, at high frequency, the tracks operate like a transmission line, radiating energy. This problem is exacerbated as the length of the track is increased, when the inter-conductor gap is increased and when the current flow is increased. Such drawbacks would clearly be overcome by employing a low d.c. voltage source for feeding the tracks, but this is subject to its own problems, in particular relating to the efficiency of rectification.

The conventional manner to produce d.c. voltage from an incoming a.c. voltage source is to rectify the a.c. voltage using a passive rectifier employing conventional bipolar rectifier diodes. Such diodes are typically made from silicon having a forward bias voltage of 0.7 V. Thus, the power dissipated by each rectifier diode during the half cycle that it conducts is equal to the product of the forward bias voltage of 0.7 multiplied by the current passed by the diode. In a typical arrangement for energizing a series of low voltage halogen lamps having a combined current consumption of 25 A, the power loss across each rectifier diode would thus amount to 17.50 W which, when combined with the losses in the chopper circuit and step-down transformer, is unacceptable.

In this regard it is to be noted that inefficient rectification of the output not only increases operating costs but also results in heat dissipation requiring that the physical size of the power supply be increased. This, of course, militates against the very reason for using high frequency in the first place: namely to reduce the size of the power supply. Therefore the conventional approach to rectification, which is widely applied in other systems, is not suitable for halogen lighting due to the use of low voltages and hence high currents and the necessity of keeping power losses down so as to enable a small physical size.

In one popular arrangement, the low-voltage power is applied to two uninsulated conductors in the form of cables or rigid rails to which the lamps are attached. Such an arrangement is subject to the hazard that an electrically conductive short, particularly a thin wire, which is accidentally applied between the two conductors may conduct potentially large currents. The resultant heating of the wire constitutes a fire hazard. This situation manifests itself as an increase in current which may either be detected using a fuse which burns out when the heating effect of the current flow exceeds an allowed threshold, by a heat-sensitive electronic device, or by a more sophisticated current sensing element which is more directly responsive the current flow. For example, U.S. Pat. No. 5,523,653 discloses a low voltage lighting fixture connected to an isolation step-down transformer. The fixture is protected from limited or maximum short circuit conditions by monitoring the secondary current of the step-down transformer until a fault is detected, whereupon the protection circuit de-energizes the primary of the transformer.

None of these solutions is entirely satisfactory because none operates instantaneously when the power rating of the load connected to the supply exceeds the power rating of the supply itself. Specifically, even in the more sophisticated case where current itself is monitored, since the supply voltage is alternating, the current must climb from zero to the danger threshold before the protection element can operate. Even in this brief time interval during the 50/60 Hz cycle, the electrically conductive short can reach dangerous temperatures.

SUMMARY OF THE INVENTION

It is therefore an object of the invention to provide a low voltage illumination system which addresses the drawbacks associated with hitherto proposed low voltage illumination systems.

According to the invention, there is provided a low voltage illumination system, comprising:

connection means for connecting to a source of low frequency a.c. voltage, frequency conversion means coupled to the source of a.c. voltage for converting the low frequency a.c. voltage to high frequency a.c. voltage, step down transformer means coupled to an output of the frequency conversion means for converting to high frequency, low voltage a.c., a synchronous rectifier coupled to a secondary of the step down transformer means for converting the high frequency low voltage a.c. to a low magnitude nominally d.c. voltage, and a pair of conductors connected to said low magnitude nominally d.c. voltage for connecting low voltage lamps thereto.

Low voltage lamps may be directly connected to an output of the synchronous rectifier. Alternatively, there may be connected thereto a track comprising a pair of spaced apart low voltage d.c. conductors for connecting low voltage lamps thereto. Owing to the fact that the voltage across the track conductors is d.c., there is no limit to the spacing between the conductors which affects a.c. track lighting systems.

Preferably, the components in the illumination system according to the invention are provided in modules so that each module is compatible with complementary components made by other manufacturers. This modularity increases the versatility of the invention.

According to a preferred embodiment, the power supply includes a protection element directly responsive to the impedance of the load across the supply so as to interrupt the supply immediately the load impedance exceeded an allowed threshold. Such a protection element is designed to operate anywhere in the a.c. current cycle thus overcoming the drawbacks with conventional approaches.

BRIEF DESCRIPTION OF THE DRAWINGS

In order to understand the invention and see how the same may be carried out in practice, a preferred embodiment will now be described, by way of non-limiting example only, with reference to the accompanying drawings, in which.

DETAILED DESCRIPTION OF A PREFERRED EMBODIMENT

Figure 1:
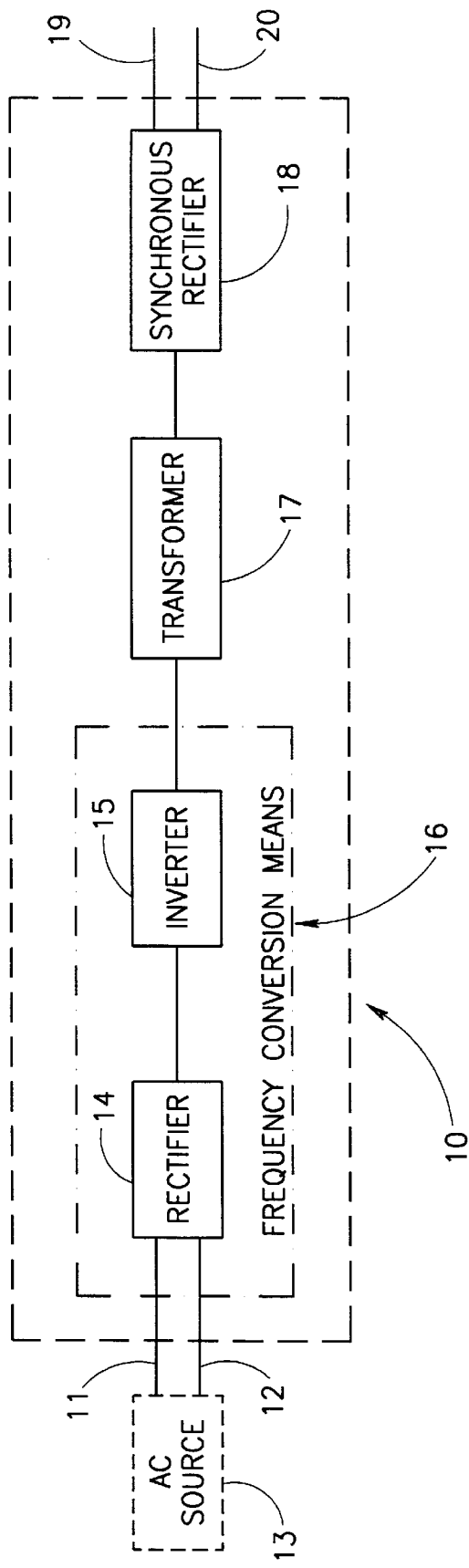
FIG. 1 is a block diagram showing the principal functional components of an low voltage d.c. illumination system according to the invention.

FIG. 1 shows a low voltage illumination system designated generally as which comprises a pair of input terminals 11 and 12 (constituting connection means) for connecting to a source of low frequency a.c. voltage 13 which is shown in dotted outline since it is not itself part of the invention. The a.c. voltage source 13 is derived from a conventional electricity supply feeder having a voltage of 220/110 V and a supply frequency of 50/60 Hz. A conventional rectifier 14 is coupled via the terminals 11 and 12 to the source of a.c. voltage 13 for converting the low frequency a.c. voltage to d.c. which is then fed to an inverter 15 containing a conventional chopper circuit for converting to high frequency a.c. at 30 KHz. The rectifier 14 in combination with the inverter 15 thus constitutes a frequency conversion means 16 for converting the low frequency a.c. voltage to high frequency a.c. voltage.

A step down transformer 17 is coupled to an output of the frequency conversion means 16 for converting the high frequency supply voltage of 220/110 V to high frequency, low voltage a.c. signal having a voltage of typically 12 V. The step down transformer 17 is preferably implemented using a toroidal ferrite core and the output winding is preferably implemented using a litz (bundle of very fine insulated wires) in order to minimize losses by reducing the leakage current due to the air gap between the primary and secondary windings and by reducing losses due to the skin-effect and proximity effect. Alternatively a higher frequency may be used and the output transformer implemented using a planar transformer as described below. Although this a.c. voltage is capable of powering low voltage halogen lamps connected to a pair of conductors coupled directly to the step down transformer 17, this is not desirable because such conductors can behave as a transmission line at high frequency resulting in significant energy loss. This is particularly manifest in the case where the conductors are configured as spaced apart rails with or without insulation, such as are used in cable lighting systems, wherein the separation of the conductors increases the transmission line effect.

To prevent the drawback associated with large high frequency currents, the high frequency signal is rectified using a synchronous rectifier 18 coupled to a secondary winding (not shown) of the step down transformer 17 for converting the low voltage a.c. to low voltage d.c. A pair of conductors 19 and 20 are connected to the low voltage d.c. for connecting low voltage lamps (not shown) thereto.

Track lighting systems per se are known and it is therefore not necessary to describe in detail all the components shown functionally in FIG. 1. Rather, with reference to FIGS. 2 and 3 there will now be described those features which are specific to the present invention and offer improved performance over known systems.

Figure 2:
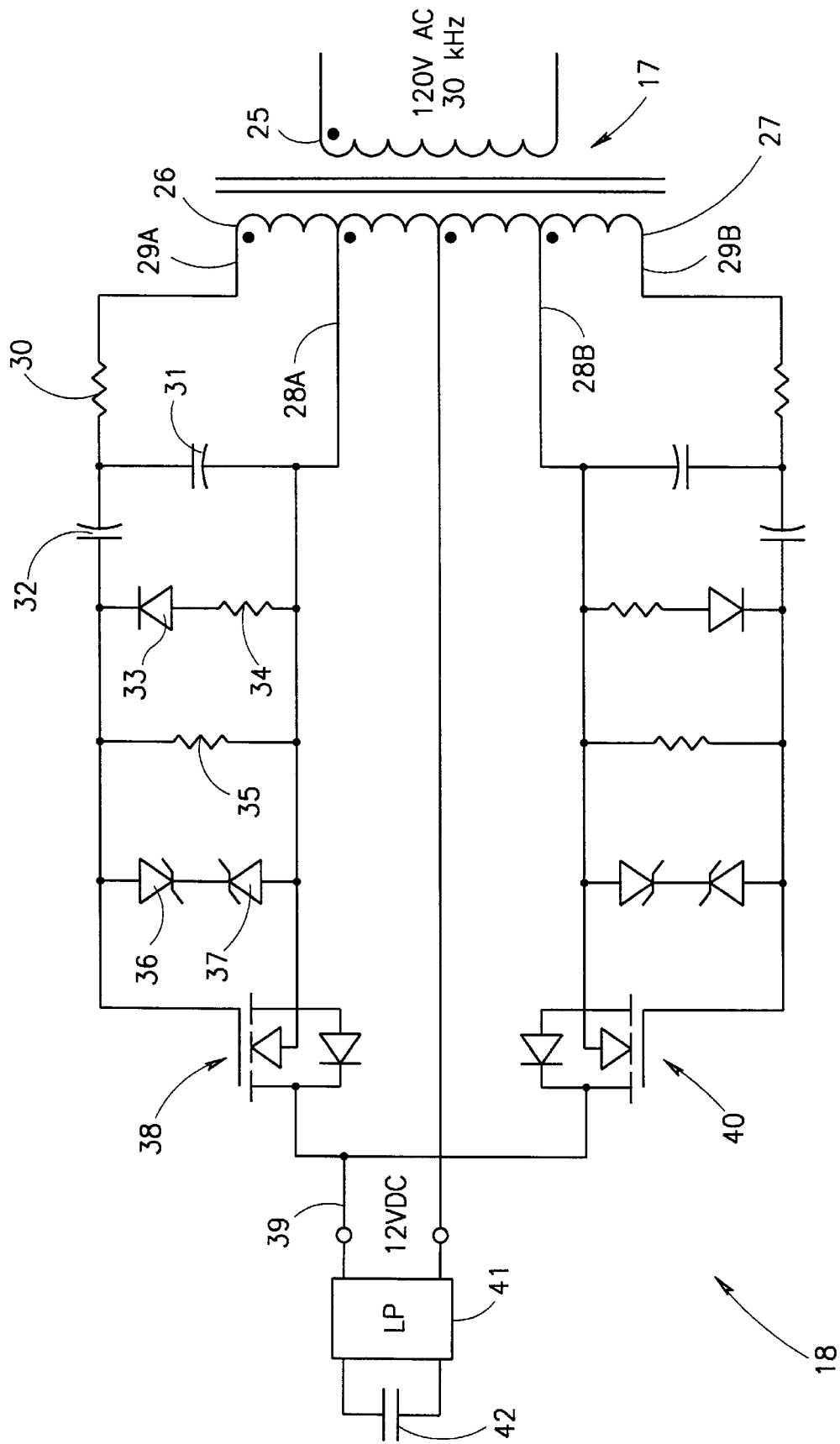
FIG. 2 is a schematic circuit diagram of a synchronous rectifier for use with the system shown functionally in FIG. 1.

FIG. 2 is a schematic circuit diagram of the synchronous rectifier 18 shown functionally in FIG. 1. The step down transformer 17 has a single primary winding 25 rated at 120 V a.c. at 30 KHz and a secondary winding 26 having a center-tap connected to a zero voltage rail 27, and on each side of which there are two taps connected to respective first and second voltage rails 28a, 29a and 28b, 29b each exhibiting a differential voltage of 12 V a.c. at 30 KHz. The circuit is symmetrical and therefore only the upper half will now be described for the positive half cycle of the a.c. voltage when the upper coil connection (shown dotted) is positive. In this case, the voltage on the first voltage rail 28a varies between zero and about +17V (corresponding to +12 V (rms)) whilst the voltage on the second voltage rail 29a varies between zero and +24 V (rms). Regardless of the instantaneous voltage on the two voltage rails 28a and 29a, there exists a differential voltage therebetween of constant polarity and rms magnitude equal to 12 V.

Connected across the first and second voltage rails 28a and 29a is a filter comprising a resistor 30 and a capacitor 31 for filtering out high frequency components. Connected to the junction of the resistor 30 and the capacitor 31 is a capacitor 32 rated at 100 nF which is connected to the cathode of a rectifier diode 33 whose anode is connected to the first voltage rail 28a via a current limiting resistor 34. During the positive half cycle, the first voltage rail 28a is at +12 V (rms) and the second voltage rail is at +24 V (rms). Consequently, the rectifier diode 33 is reverse biased and non-conducting, thereby preventing discharge of the capacitor 32 through the resistor 34. However, during the negative half cycle, the first voltage rail 28a is at −12 V (rms) and the second voltage rail is at −24 V (rms). Consequently, the rectifier diode 33 is then forward biased and conducts current, thereby charging the capacitor 32. Thus, during successive negative half cycles the capacitor 32 accumulates charge.

Connected across the series connected rectifier diode 33 and resistor 34 is a resistor 35 and a pair of back-to-back connected Zener diodes 36 and 37 rated at 15 V which ensure that during both positive and negative half cycles, the differential output voltage thereacross never exceeds 15 V. The anode of the upper Zener diode 36 is connected to the gate terminal of a MOSFET 38 whose source terminal is connected to the first voltage rail 28a and whose drain terminal is connected to the 12 V d.c. output 39 of the synchronous rectifier in parallel with the drain terminal of the complementary MOSFET 40 in the lower half of the circuit.

Figure 3A:
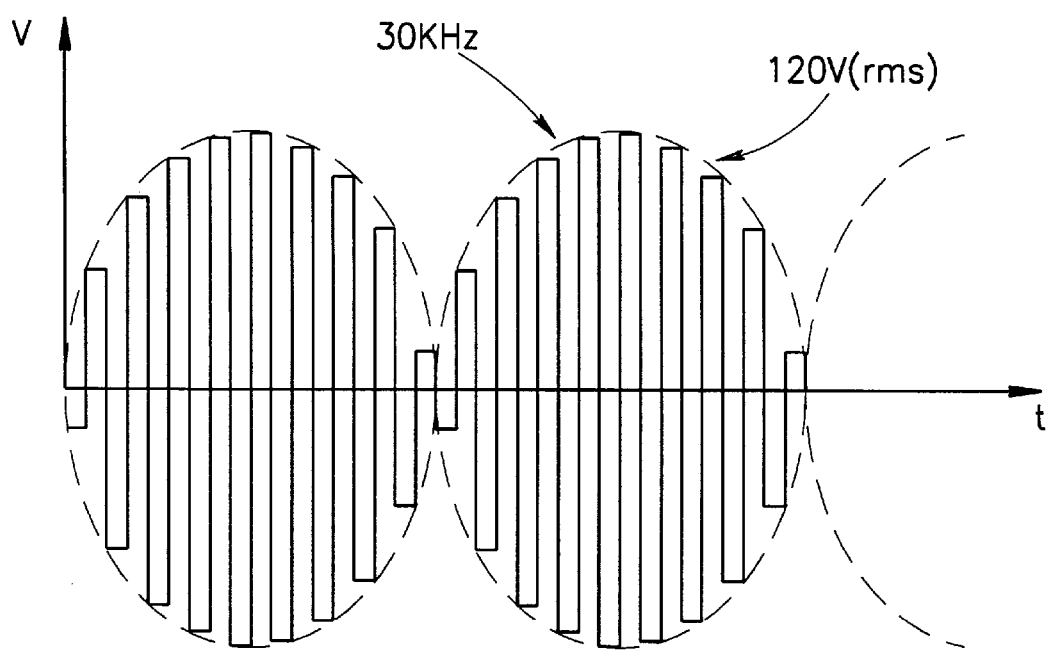
FIGS. 3a to 3d are schematic representations of various voltage waveforms associated with the synchronous rectifier shown in FIG. 2.

The operation of the circuit will now be explained with reference to the voltage waveforms shown schematically in FIGS. 3a to 3d of the drawings. FIG. 3a shows the voltage waveform at the input to the step down transformer 17 across the primary winding 25. It will be noted that the voltage across the primary winding 25 corresponds to a 30 KHz square wave pulse modulated by a 100 Hz full wave rectified envelope. During the positive half cycle, the voltage fed to the gate terminal of the MOSFET 38 is at approximately 24 V (rms) less some voltage dropped across the resistor 30. The voltage fed to the source terminal of the MOSFET 38 is nominally 12 V (rms) equal to the supply voltage of the first voltage rail 28a. Consequently, there exists a differential voltage of +12 V (rms) between the gate and source terminals of the MOSFET 38 which therefore conducts current. In similar manner, there exists a differential voltage of −12 V (rms) between the gate and source terminals of the MOSFET 40 in the lower half of the circuit which is therefore cutoff. During the negative half cycle, the situation reverses and the upper MOSFET 38 is cutoff whilst the lower MOSFET 40 conducts, its drain still providing the desired output of 12 V d.c.

Figure 3B:
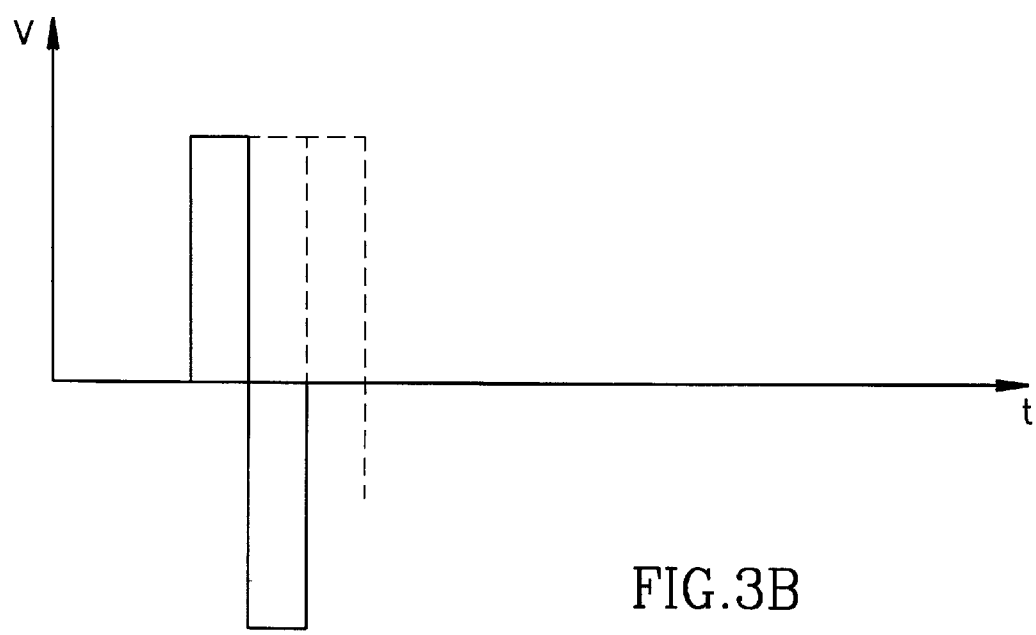

In FIG. 3b, the full line shows the voltage waveforms on the upper first voltage rail 28a, whilst the dotted line shows the complementary situation prevailing on the lower first voltage rail 28b whose voltage is in anti-phase with the voltage on the upper first voltage rail 28a. In both cases, an instantaneous voltage sample is shown, it being understood that just as the voltage across the primary winding 25 of the step down transformer 17 is a 100 Hz modulated high frequency pulse, so too is the voltage across the respective secondary windings of the step down transformer 17 a modulated 30 KHz pulse having a fundamental frequency of 100 Hz. Thus, the absolute instantaneous voltages across the voltage rails 28a and 28b vary between zero and ±17 V (12V rms).

Figure 3C:
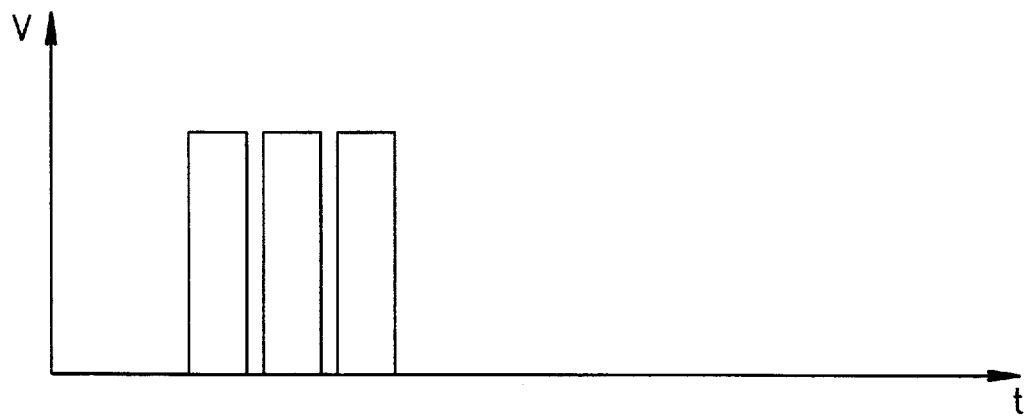
Figure 3D:
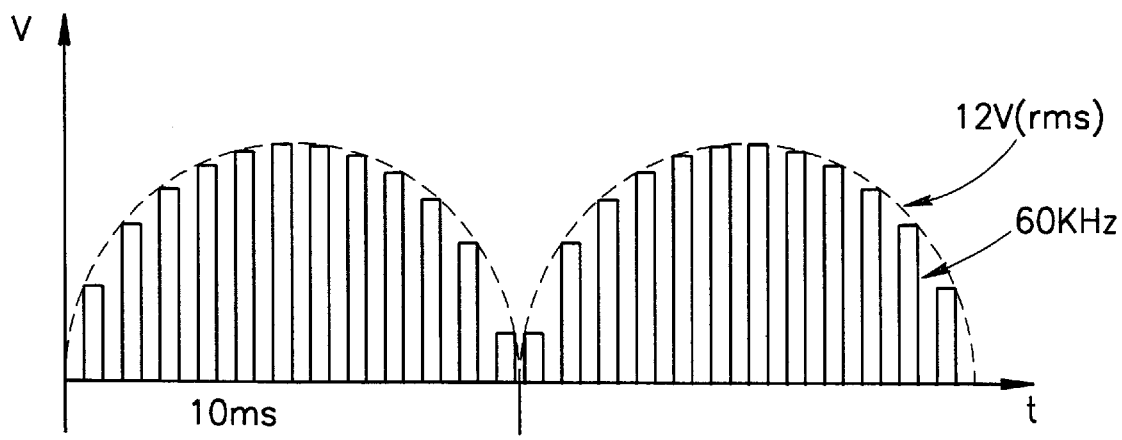

FIG. 3c shows an instantaneous sample of the voltage appearing at the output 39 of the synchronous rectifier showing successive nominally square wave pulses derived alternately from the upper and lower MOSFETs 38 and 40. FIG. 3d shows the actual voltage waveform appearing across the output 39 of the synchronous rectifier comprising rectified 30 KHz pulses (i.e. at a frequency of 60 KHz) modulated by a full wave rectified 100 Hz envelope. Each pulse has a duty cycle of approximately 16 μs, there being a dead time of several microseconds at each end of the rectified a.c. half cycle owing to the time between one MOSFET switching OFF and the complementary MOSFET switching ON. If necessary, the high frequency component can be suppressed using a low pass filter 41 connected between the output 39 of the synchronous rectifier and the zero voltage rail 27. Likewise, (although not usually necessary when only lamps are to be connected to the system) the low frequency 100 Hz ripple can be smoothed in known manner by means of a capacitor 42 also connected across the output rails.

The function of the capacitor 32 is now described. Without this capacitor there would be a considerable dead time during which both of the MOSFETs 38 and 40 would be off around the time of the zero crossing of the low frequency power source (typically occurring at a frequency of 100 Hz). This derives from the fact that in order for either of the MOSFETs to conduct, there must exist a gate to source voltage $V_{GS}$ of at least 8 V (assuming a pinch off voltage of approximately 4 V). This means that, under normal circumstances, a MOSFET will remain ON only whilst the differential voltage across the respective first and second voltage rails exceeds 8 V.

However, in the circuit shown in FIG. 2, the capacitor 32 allows the MOSFET to continue conducting even when the differential voltage across the respective first and second voltage rails falls below 8 V, providing that $V_{GS}$ does not fall below approximately 5 V. This decrease in the dead time between switching of the MOSFETs 38 and 40 is brought about because during the negative half cycle when a MOSFET is OFF, the capacitor 32 in the corresponding half of the circuit becomes charged, as explained above, and maintains its charge because the diode 33 is reverse biased during the subsequent positive half cycle when the MOSFET is ON. Therefore, when $V_{GS}$ drops below 8 V, the capacitor 32 discharges through the MOSFET which thus remains ON until the capacitor 32 fully discharges. The capacitor 32 thus constitutes a residual storage means for storing charge during the time when the MOSFET is OFF so as to boost the gate-to-source voltage during the positive half cycle when the differential voltage across the upper and lower voltage rails becomes too low to switch the MOSFET to its ON state, thereby extending the proportion of the 100 Hz cycle during which the MOSFETs are able to switch ON.

It should be noted that the output of the synchronous rectifier 18 is not pure d.c. but has superimposed thereon a.c. harmonics having fundamental frequencies of twice the supply frequency and of twice the inverter frequency, respectively, as well as other weaker harmonics. Since the power supply is intended for connecting to low voltage lamps, there is no need to filter out this harmonic component. However, if desired, additional components may be provided within the synchronous rectifier for altering the waveform of the output voltage. It is thus to be understood that within the context of the invention and the appended claims, the term "low magnitude nominally d.c. voltage" is intended to imply a nominally d.c. voltage of low magnitude (i.e. compared to the supply voltage) and of low frequency compared to the very high frequency (30 KHz) associated with the step down transformer 17. In other words the object of the synchronous transformer 18 is to render the output voltage sufficiently low frequency to avoid the transmission line radiation associated with very high frequency; whilst still allowing the use of very high frequency in the voltage conversion stage so as to reduce the bulk of the step down transformer 17.

When the MOSFET 38 conducts, its output impedance is nominally 4 mΩ, whilst when it is switched off its output impedance is in the order of several megohms. The power dissipated across the MOSFET 38, assuming an output current of 25 A, is thus equal to $I^2R$ i.e. $625*4*10^{-3}=2.5$ W. As against this, if a rectifier diode having a forward bias voltage of 0.7 V or a conventional bipolar junction transistor having a base-emitter voltage $V_{BE}$ equal to 0.7 V were employed at the output of the synchronous transformer 18, then the power loss would be equal to $25*0.7=17.5$ W. It is thus clear that use of an active rectifier employing MOSFETs results in much higher efficiency. This increase in efficiency is particularly important when a low voltage source is employed because the lower the supply voltage, the more significant is the junction bias voltage of a conventional rectifier or bipolar junction transistor. Put another way, the lower the supply voltage, the higher is the fractional power loss across the junction, and the greater is the advantage of using a MOSFET as described.

It should be noted that in the circuit described above, the MOSFETs switch the positive output terminal. A 24V rail is therefore needed to switch the MOSFET as the gate voltage must be approximately 10V more positive than the source voltage in order to switch on the MOSFET. This requires that fixed output taps be provided on the transformer. Alternatively the MOSFETs may be connected to the negative output terminal thus requiring only three output taps of 12V (rms), 0V and 12V (rms) with negative phase on the transformer eliminating taps 26 and 27. To implement such a circuit the source and drain of each of the two MOSFETS is reversed, and the rails 29A and 28B and similarly 29B and 28A are unified.

It has been explained that a principal reason for converting from the 50/60 Hz low frequency associated with the electricity supply feeder to high frequency a.c. at 30 KHz is the reduction in size of the step down transformer which is thereby facilitated. This reduction is brought about because at high frequencies, the transformer core can be replaced by a miniaturized ferrite core assembly which can easily be accommodated in a relatively shallow ceiling recess.

Figure 4:
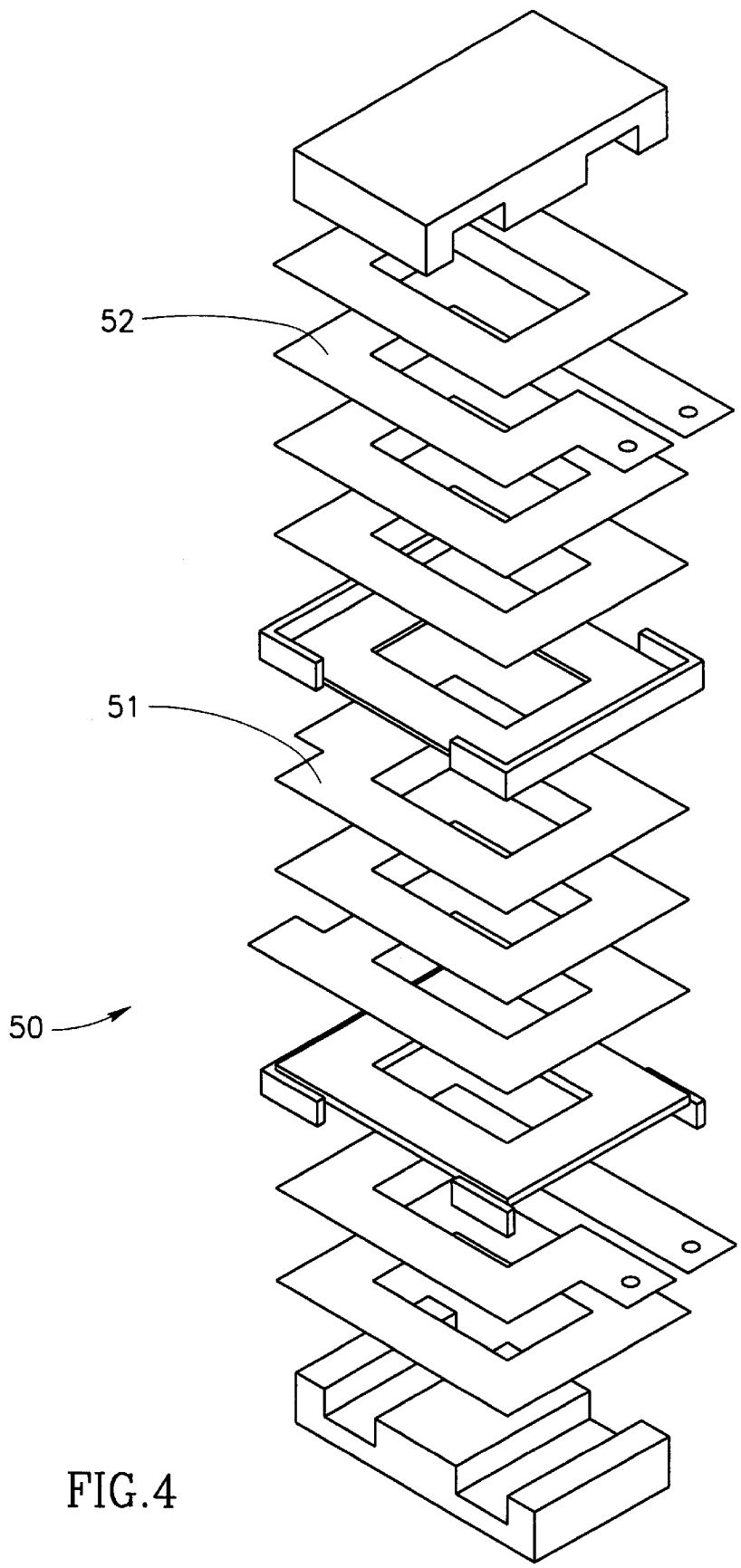
FIG. 4 is a pictorial representation of a planar transformer for use with the system depicted in FIG. 1.

FIG. 4 is a pictorial representation showing an exploded view of a planar transformer 50 which may used for effecting the step down transformation associated with the step down transformer 17 provided the inverter outputs a frequency substantially higher than 30 KHz and preferably of the order of several hundred KHz. The windings of the planar transformer 50 are constructed on a multilayer printed circuit board assembly using low thickness copper strips 51 and include leadframe windings 52 to decrease the influence of skin and proximity effects, thereby allowing higher frequencies to be employed. Full details of a planar transformer suitable for use with the low voltage illumination system 10 are provided in U.S. Pat. No. 5,010,314 which is incorporated herein by reference. The use of such frequencies and of planar transformers has not hitherto been considered in lighting systems due to the fact that it is not customary to rectify the output of power supplies for lighting and, without rectification, the use of such high frequencies is unacceptable. However the advantages offered by the use of a planar transformer according to the invention, particularly the cheaper manufacturing costs, mean that such use is advantageous even if the rectifier is a passive diode bridge despite the large heat losses of such a rectifier.

Figure 5:
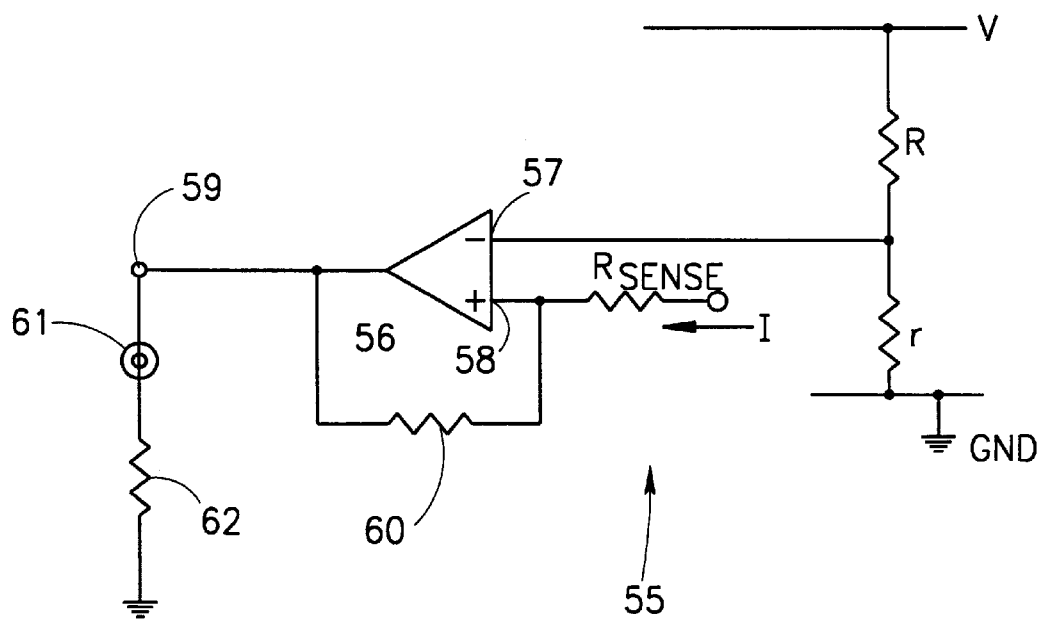
FIG. 5 is a schematic circuit diagram of a protection circuit for use with the system shown functionally in FIG. 1 and responsive to the load impedance across the supply for preventing overload.

FIG. 5 is a schematic circuit diagram of a protection circuit 55 for use with the system shown functionally in FIG. 1 and responsive to the load impedance across the supply for preventing overload. The protection circuit 55 includes a comparator 56 having fed to an inverting input 57 (constituting a first input of the comparator) a function of a supply voltage associated with the illumination system and having fed to a non-inverting input 58 (constituting a second input of the comparator) a function of a current flow associated with the illumination system. To this end there is connected across the supply a voltage divider comprising a pair of resistors R and r whose common junction is connected to the inverting input 57 of the comparator 56. Likewise, the output current is fed through a sensing resistor $R_{sense}$ so that the voltage across the sensing resistor $R_{sense}$ is a function of the supply current, I.

An output 59 of the comparator 56 goes from a logical LOW level (constituting a first state) to a logical HIGH level (constituting a second state) when a predetermined function of the impedance across the conductors falls below a predetermined threshold R'. Specifically, the output 59 of the comparator 56 goes from LOW to HIGH if:

$$I \cdot R_{sense} > V\left(\frac{r}{R+r}\right)$$

-continued $$\frac{R_{sense}(R+r)}{r} > \frac{V}{I}$$

$$\frac{R_{sense}(R+r)}{r} > R'$$

A circuit interruption device (not shown) is responsively coupled to the output 59 of the comparator 56 for interrupting power to the pair of conductors if the impedance falls below the predetermined threshold R'. A feedback resistor 60 (constituting a latching circuit) is connected between the output 59 of the comparator 56 and the non-inverting input 58 of the comparator 56 for maintaining the output 59 of the comparator 56 HIGH regardless of a subsequent rise in impedance across the conductors. An indication lamp 61 is connected between the output 59 of the comparator 56 and GND via a current limiting resistor 62. The indication lamp 61 constitutes an indication means responsive to the impedance across the conductors falling below the predetermined threshold for indicating an active state of the protection circuit, during which power is interrupted to the conductors. Clearly, in addition to, or instead of, the lamp 61, there may be provided any other suitable audible and/or visual alarm for indicating a fault condition across the conductors.

It will be appreciated that reverse logic can be applied such that the current function is fed to the inverting input 57 and the voltage function is fed to the non-inverting input 58, in which case the interruption device is operated when the output 59 of the comparator 56 goes from HIGH to LOW.

The comparator 56 thus constitutes an impedance measuring circuit which may be incorporated within the frequency conversion means 16, preferably between the rectifier 14 and the inverter 15 or at any other location within the system.

In either case, the protection circuit 55 operates to interrupt power immediately a short circuit or near short circuit across the output of the power supply regardless of where the resulting drop in output impedance is detected in the a.c. current cycle. This is in contrast to hitherto proposed protection circuits which are directly responsive to overcurrent detection and therefore do not operate towards the start of the a.c. current cycle when the magnitude of the current waveform is still too low to constitute an overcurrent even if the peak value of the waveform is indeed dangerously high.

As is known, when lamps are operated at less than their full power rating, as when a dimmer is employed, for example, the resistance of the lamps' filaments drops owing to the lower temperature of operation. Therefore, if the illumination system is to be used in conjunction with dimming devices, then in order to ensure that the reduced impedance offered by the lamps across the conductors does not cause the protection circuit to trip the power supply, it is necessary that the predetermined threshold R' be less than the system impedance at maximum load and full dimming.

Unless steps are taken to compensate for the variation in lamp impedance owing to change in operation voltage, effectively less protection is offered at full voltage operation than at reduced voltage operation. It is therefore preferable to render the threshold R' variable based on the instantaneous value of the lamp voltage, so that if a dimming device be employed thereby reducing the lamp voltage, maximum protection will be offered for all settings of the dimming device. To this end, the value of any of the parameters R, r and $R_{sense}$ may be rendered dependent on the lamp voltage appearing across the conductors. This can be done continuously by use of a suitable voltage-controlled resistor such as, for example, a FET operated in the region before pinch-off, where the drain to source voltage $V_{DS}$ is small. Alternatively, discrete control can be provided by means of a bank of equal value resistors connected in parallel which are selectively switched in circuit according to the lamp voltage.

In order to provide the required selection, each of the resistors may be connected in series with a corresponding MOSFET whose gate terminals are driven by a respective threshold comparator having a threshold corresponding to a different preset voltage. By such means, the corresponding threshold comparator effects enabling or disabling of the resistors allowing the resistance of the resistor bank to be varied as required. The number of different resistance levels thus selectable is, of course, equal to $2^N$ where N is the number of resistors in the resistor bank.

It will be appreciated that the overload protection circuit 55 is capable of more general application to any power supply wherein immediate overload protection is required in the event of a sudden drop in output impedance owing to a short circuit or near short circuit across the output of the power supply.

In the preferred embodiment, the synchronous rectifier is a half wave rectifier using only two MOSFETs thus requiring a center-tapped transformer. Alternatively, a full bridge rectifier employing four MOSFETs may be used, thus obviating the need for a transformer with a center-tap.

It will also be appreciated that the illumination system may be contained within a common housing having lugs or other attachment means for fixing the housing to a support surface. Alternatively, the synchronous rectifier may be provided in a physically separate module to the frequency conversion means and the transformer means. Such a modular approach affords the possibility to connect a low voltage lamp to an existing high frequency, low voltage a.c. source such as a so-called electronic transformer via the synchronous rectifier module.

What is claimed is:

1. A protection circuit for protecting a power supply against overload, the protection circuit comprising:
    impedance measuring means for measuring an impedance across an output of the power supply,
    circuit interruption means responsively coupled to the impedance measuring means for interrupting the power supply if said impedance falls below a predetermined threshold, and
    a latching circuit coupled to the protection circuit for maintaining the protection circuit in an active state regardless of a subsequent rise in impedance across the output of the power supply.

2. A protection circuit for protecting a power supply against overload, the protection circuit comprising:
    impedance measuring means for measuring an impedance across an output of the power supply, and
    circuit interruption means responsively coupled to the impedance measuring means for interrupting the power supply if said impedance falls below a predetermined threshold, further including an indication means responsively coupled to the impedance measuring means for providing an indication if said impedance falls below said predetermined threshold.

3. A protection system for protecting a power supply against overload, the protection circuit comprising:
    impedance measuring means for measuring an impedance across an output of the power supply, and
    circuit interruption means responsively coupled to the impedance measuring means for interrupting the power supply if said impedance falls below a predetermined threshold, wherein the predetermined threshold is a function of lamp voltage.

4. A low voltage illumination system, comprising:
    connection means for connecting to a source of low frequency a.c. voltage,
    frequency conversion means coupled to the source of a.c. voltage for converting the Low Frequency a.c. voltage to high frequency a.c. voltage,
    step down transformer means coupled to an output of the frequency conversion means for converting a high frequency, low voltage a.c.,
    a synchronous rectifier coupled to a secondary of the step down transformer means for converting the high frequency low voltage a.c. to a low magnitude nominally d.c. voltage,
    a pair of conductors connected to said low magnitude nominally d.c. voltage for connecting low voltage lamps thereto, and
    a protein circuit comprising:
        an impedance measuring circuit for measuring an impedance across the pair of conductors, said impedance measuring circuit including a comparator circuit having fed to a first input thereof a function of a supply voltage associated with the illumination system and having fed to a second input thereof a function of a current flow associated with the illumination system such that an output of the comparator goes from a first state to a second state when a predetermined function of the impedance across the conductors falls below said predetermined threshold, and
        a circuit interrupter responsively coupled to the impedance measuring circuit for interrupting power to said pair of conductors if said impedance falls below a predetermined threshold.

5. A low voltage illumination system, comprising:
    connection means for connecting to a source of low frequency a.c. voltage,
    frequency conversion means coupled to the source of a.c. voltage for converting the low frequency a.c. voltage to high frequency a.c. voltage,
    step down transformer means coupled to an output of the frequency conversion means for converting to high frequency, low voltage a.c.,
    a synchronous rectifier including at least two Field Effect Transistors and being coupled to a secondary of the step down transformer means for converting the high frequency low voltage a.c. to a low magnitude nominally d.c. voltage,
    a pair of conductors connected to said low magnitude nominally d.c. voltage for connecting low voltage lamps thereto, and
    a residual storage device for storing charge when a first one of the Field Effect Transistors is OFF so as to boost a gate-to-source voltage thereof when said first one of the Field Effect Transistors is ON, in order that the first one of the Field Effect Transistors remains ON for an extended time period.

6. A low voltage illumination system, comprising:
    connection means for connecting to a source of low frequency a.c. voltage,
    frequency conversion means coupled to the source of a.c. voltage for converting the low frequency a.c. voltage to high frequency a.c. voltage, step down transformer means coupled to an output of the frequency conversion means for converting to high frequency, low voltage a.c., a synchronous rectifier coupled to a secondary of the step down transformer means for converting the high frequency low voltage a.c. to a low magnitude nominally d.c. voltage, and a pair of conductors connected to said low magnitude nominally d.c. voltage for connecting low voltage lamps thereto, further including a protection circuit comprising:
impedance measuring means for measuring an impedance across the pair of conductors, and
circuit interruption means responsively coupled to the impedance measuring means for interrupting power to said pair of conductors if said impedance falls below a predetermined threshold,
wherein the impedance measuring means includes:
a comparator circuit having fed to a first input thereof a function of a supply voltage associated with the illumination system and having fed to a second input thereof a function of a current flow associated with the illumination system such that an output of the comparator goes from a first state to a second state when a predetermined function of the impedance across the conductors falls below said predetermined threshold.

7. The illumination system according to claim 6, further including a latching circuit coupled to the circuit interruption means for maintaining the circuit interruption means in an active state thereby preventing reconnection of power to the conductors.

8. The illumination system according to claim 7, wherein the latching circuit comprises a feedback resistor connected between the output of the comparator circuit and a non-inverting input of the comparator circuit.

9. A protection circuit for protecting a power supply against overload, the protection circuit comprising:

impedance measuring means for measuring an impedance across an output of the power supply, and circuit interruption means responsively coupled to the impedance measuring means for interrupting the power supply if said impedance falls below a predetermined threshold, wherein the impedance measuring includes:
a comparator circuit having fed to a first input thereof a function of a supply voltage associated with the power supply and having fed to a second input thereof a function of a current flow associated with the power supply such that an output of the comparator goes from a first state to a second state when a predetermined function of the impedance across the output of the power supply falls below said predetermined threshold.

10. The protection circuit according to claim 9, further including a latching circuit coupled to the output of the comparator circuit for maintaining said output in the second state regardless of a subsequent rise in impedance across the output of the power supply.

11. The protection circuit according to claim 10, wherein the latching circuit comprises a feedback resistor connected between the output of the comparator circuit and a non-inverting input of the comparator circuit.

12. A low voltage illumination system, comprising:
connection means for connecting to a source of low frequency a.c. voltage,
frequency conversion means coupled to the source of a.c. voltage for converting the low frequency a.c. voltage to high frequency a.c. voltage,
step down transformer means coupled to an output of the frequency conversion means for converting to high frequency, low voltage a.c.,
a synchronous rectifier coupled to a secondary of the step down transformer means for converting the high frequency low voltage a.c. to a low magnitude nominally d.c. voltage,
a pair of conductors connected to said low magnitude nominally d.c. voltage for connecting low voltage lamps thereto, and
a protection circuit comprising:
impedance measuring means for measuring an impedance across the pair of conductors,
circuit interruption means responsively coupled to the impedance measuring means for interrupting power to said pair of conductors if said impedance falls below a predetermined threshold, and
a latching circuit coupled to the circuit interruption means for maintaining the circuit interruption means in an active state thereby preventing reconnection of power to the conductors.

13. The illumination system according to claim 12, wherein:
the high frequency is an order of several hundred KHz, and
the transformer means is a planar transformer.

14. The illumination system according to claim 12, wherein the frequency conversion means includes a full bridge inverter.

15. The illumination system according to claim 12, wherein the conductors are spaced apart.

16. The illumination system according to claim 12, wherein the synchronous rectifier is physically separated from the frequency conversion means and the transformer means.

17. The illumination system according to claim 12, further including a smoothing means coupled between the low voltage d.c. and the conductors for removing high frequency voltage components from the low voltage d.c.

18. The illumination system according to claim 12, wherein the impedance measuring means is associated with the frequency conversion means for measuring an output impedance of the of a.c. voltage source.

19. The illumination system according to claim 12, wherein the protection circuit further includes an indication means responsively coupled to the impedance measuring means for providing an indication if said impedance falls below said predetermined threshold.

20. The illumination system according to claim 12, wherein the predetermined threshold is a function of lamp voltage.

* * * * *

UNITED STATES PATENT AND TRADEMARK OFFICE
CERTIFICATE OF CORRECTION

PATENT NO.    : 6,097,158
DATED         : August 1, 2000
INVENTOR(S)   : Dror Manor et al.

It is certified that error appears in the above-identified patent and that said Letters Patent is hereby corrected as shown below:

<u>Title page,</u>
Insert Item -- [30]    Foreign Application Priority Data
June 3, 1998 (IL) Israel .......... 120983 --.

Signed and Sealed this

Thirteenth Day of September, 2005

JON W. DUDAS
*Director of the United States Patent and Trademark Office*